(12) United States Patent
Jansen et al.

(10) Patent No.: US 6,516,279 B1
(45) Date of Patent: Feb. 4, 2003

(54) METHOD AND APPARATUS FOR CALCULATING RMS VALUE

(75) Inventors: Ronald N. Jansen, New Berlin, WI (US); Steven T. Haensgen, Oak Creek, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/573,316

(22) Filed: May 18, 2000

(51) Int. Cl.[7] .............................................. G06F 19/00
(52) U.S. Cl. .......................... 702/66; 702/66; 702/69; 702/71; 702/75; 702/79; 702/120
(58) Field of Search ............................. 702/66, 69–71, 702/73, 74, 75, 79, 1.6, 117, 120, 121, 124–126, 58, 59, 183, 187, 189, 198, FOR 103, FOR 104, FOR 106, FOR 107, FOR 110, FOR 134, FOR 135, FOR 170–171; 324/117 H, 96; 700/73, 74, 293, 294; 708/200, 202, 500, 615; 327/348

(56) References Cited

U.S. PATENT DOCUMENTS

| | | | | |
|---|---|---|---|---|
| 4,625,283 A | * | 11/1986 | Hurley | 364/487 |
| 4,672,555 A | * | 6/1987 | Hart et al. | 364/483 |
| 4,721,906 A | * | 1/1988 | Ferguson et al. | 324/132 |
| 5,224,054 A | * | 6/1993 | Wallis | 364/483 |
| 5,229,651 A | * | 7/1993 | Baxter, Jr. et al. | 307/66 |
| 5,446,358 A | * | 8/1995 | Nakata | 318/696 |
| 5,544,065 A | * | 8/1996 | Engel et al. | 364/484 |
| 5,578,928 A | * | 11/1996 | Langan | 324/509 |
| 5,600,527 A | * | 2/1997 | Engel et al. | 361/93 |
| 5,828,983 A | * | 10/1998 | Lombardi | 702/66 |
| 5,932,998 A | * | 8/1999 | LaWhite | 324/76.42 |
| 6,128,584 A | * | 10/2000 | Hemminger et al. | 324/142 |
| 6,137,283 A | * | 10/2000 | Williams et al. | 324/76.12 |
| 6,185,482 B1 | * | 2/2001 | Egolf et al. | 700/293 |
| 6,242,900 B1 | * | 6/2001 | Fawcett et al. | 324/76.65 |
| 6,243,652 B1 | * | 6/2001 | Fawcett et al. | 702/65 |

* cited by examiner

Primary Examiner—Marc S. Hoff
Assistant Examiner—Carol S Tsai
(74) Attorney, Agent, or Firm—Patrick S. Yoder; Alexander M. Gerasimow; William R. Walbrun (57) ABSTRACT

A technique for computing RMS values for sampled waveforms. More specifically, a technique for computing RMS values for periodic waveforms, using data taken from a full waveform, a half waveform or some other portion of a waveform is described. Each RMS calculation is based on a different algorithm and provides accurate, real time data.

22 Claims, 6 Drawing Sheets

METHOD AND APPARATUS FOR CALCULATING RMS VALUE

BACKGROUND OF THE INVENTION

1. Field of the Invention

The present invention relates generally to calculating RMS values. More particularly, the present invention relates to a technique for computing RMS values for sampled waveforms, in which a number of samples is difficult to predict. The technique permits the computation of accurate values in real time, in a processing routine designed to perform other real time operations as well.

2. Description of the Related Art

A variety of systems, particularly in the industrial control field, require sampling of data and analysis of the data to make decisions based on the measurements. The data and analysis of the data can represent various parameters, such as current, voltage, power and so forth. In a number of applications it is particularly useful to analyze sampled data based on a set of samples to determine a root-mean-squared (RMS) value. The RMS value calculations are useful in condensing a series comprising a plurality of measurements into one useful measurement.

One particular area in which RMS calculations may be useful is in the analysis of waveform data. Particularly, RMS value calculation may be useful in interpreting alternating waveforms (i.e. sine waves of voltage or current) in any electronics based system. Generally, the RMS value of a series of observations equals the square root of the quotient of the sum of the squares divided by the number of samples.

It is often desirable to know the exact RMS content of a signal. This can be accomplished by means of hardware or software-based calculation methods. In a microprocessor controlled system the means for calculating RMS may be particularly computationally inefficient. That is to say that often RMS calculations must be made in the foreground, thereby making the microprocessor unavailable to perform other system functions during the RMS calculations. Disadvantageously, this method of RMS calculation is insufficient for wide frequency range applications or for high frequency applications since the RMS calculations would literally flood the microprocessor with data and require significant calculation time, precluding the microprocessor from performing other necessary operations.

One application which is particularly well suited for variable frequency range applications is motor control. In typical motor applications a microcontroller-based variable frequency motor controller may perform RMS calculations for current or voltage. Other support or protection devices in such applications such as power systems including overload relays use similar calculations for interpreting power in the power conductors to permit protective action or reporting when a fault condition occurs, such as a ground fault, a phase loss, or an overcurrent condition. Typically, these overload relays may only operate on a frequency range from 50 hertz to 60 hertz due to the necessity of the RMS calculations based on a hardware solution. However, there is a need for a method and apparatus for calculating RMS values in motor control and other systems which operates over a wide variable frequency range, and which can make such calculations very efficiently, even as the waveform period changes.

SUMMARY OF THE INVENTION

The present invention provides a technique designed to respond to these needs. In accordance with the present technique, an RMS value of a periodic waveform is calculated based upon sampled data of the waveform. Because the waveform period may vary or be unknown, the technique permits for accurate calculation of the RMS value in accordance with one of a plurality of routines, the routine being selected based upon the quantity or quality of the sampled data. The routines thus permit a calculation to be made based upon samples taken during an acquisition cycle, the cycle covering a full waveform, a half waveform, or some other portion of the waveform. Each RMS calculation may be based on a different routine, depending upon the particular criteria set for a selection of the routine and upon the sampling permitted by the waveform period.

The technique is adaptable to a variety of devices for implementation. In particular, the technique is well suited to systems in which RMS calculations are to be made on sampled data in real time. The technique is particularly computationally efficient, such that it may be implemented with other portions of a routine repeated cyclically by a microprocessor or other processing circuit. By way of example, the technique is employed in a relay in which values of current are sampled from conductors and are used to calculate an RMS current value.

BRIEF DESCRIPTION OF THE DRAWINGS

The foregoing and other features of the invention will become apparent upon reading the following detailed description and upon reference to the drawings in which like reference numerals denote like elements, and.

DETAILED DESCRIPTION OF SPECIFIC EMBODIMENTS

Figure 1:
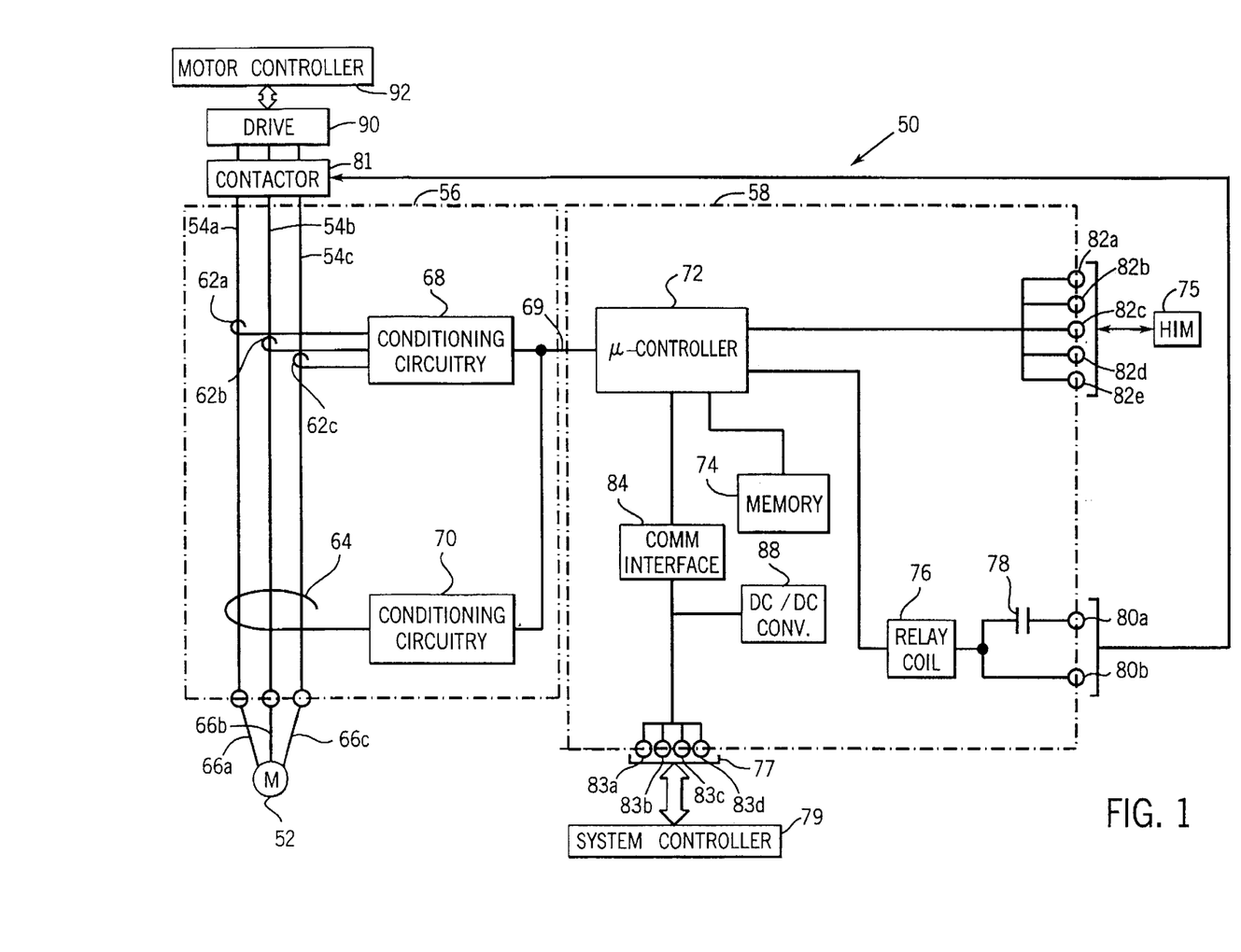
FIG. 1 is a diagrammatical illustration of a typical three-phase current detection system in accordance with aspects of the present technique.

Turning now to the drawings, and referring first to FIG. 1, an exemplary overload relay 50 for monitoring and interrupting current flow provided to a motor 52 via power conductors 54a, 54b, and 54c, and 66a, 66b and 66c is illustrated. Relay 50 includes a sensing module 56 and a control module 58. Sensing module 56 includes sensors 62a, 62b, 62c, and 64, which are arranged to monitor the current flow through power conductors 54a, 54b, and 54c. Sensors 62a–c and 64 may be Hall effect sensors or current transformers having a core through which power conductors 54a–c pass. Sensors 62a, 62b, and 62c are configured to monitor the current flow in power conductors 54a, 54b, and 54c, respectively, and provide output signals representative of the individual phase currents, L1, L2 and L3. Sensor 64 is configured simultaneously to monitor the current flow in all three power conductors and provide an output signal representative of a vector sum of the phase currents. This vector sum is also referred to here as the ground fault current.

Three-phase solid-state relays of the type shown in FIG. 1 may detect the occurrence of a ground fault in a three-phase system by monitoring or determining the vector sum of the currents in each phase. Normal operation is indicated when the phase currents substantially cancel, and a ground fault is indicated if the vector sum of the phase currents exceeds a predetermined threshold value. Similarly, sensors 62a–c may be employed to detect overcurrent conditions, current imbalances, and so forth. The output signals from sensors 62a–c and 64 are provided to conditioning circuitry 68 and 70, which are configured to appropriately condition (e.g., filter, amplify, rectify, convert) the sensor output signals for compatibility with the control circuitry in control module 58.

Control module 58 includes a microprocessor-based controller 72 which is configured to execute a variety of processing and control functions in accordance with a program stored in a memory 74, and based upon input data received via any of inputs 82a–e and 83a–d, and from sensing module 56. Inputs 82a–e may be terminals or input ports (wired or wireless) which allow data input from a compatible external source, such as a human interface module (HIM) 75. Inputs 83a–d may be terminals or pins of a modular connector 77 which, in the exemplary embodiment shown, connects overload relay 50 to a network and to other networked data sources or controllers.

Figure 2:
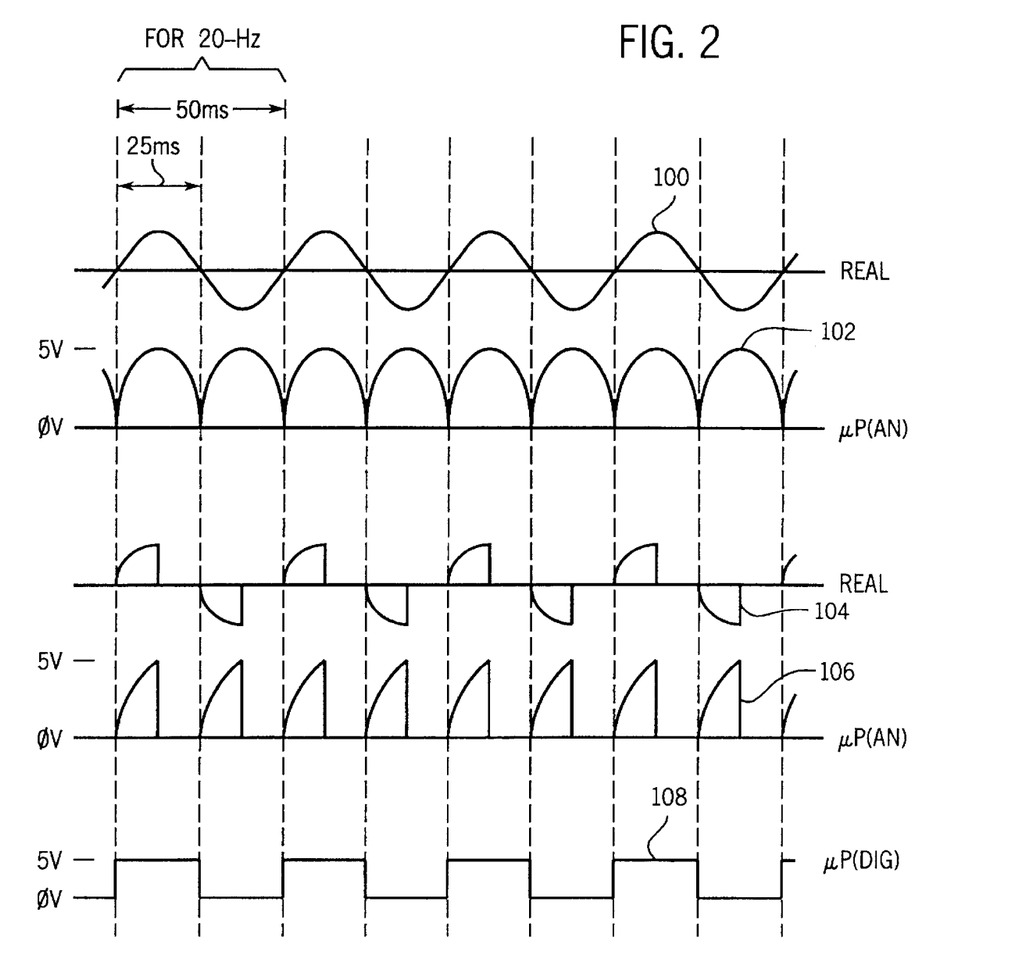
FIG. 2 illustrates exemplary waveforms that may be present in a typical three-phase current detection system of the type shown in FIG. 1.

Input 69 from the sensing module 56 preferably provides full-wave rectified AC voltage signals. Thus, the conditioning circuitry 68 and 70 receives the current measurements taken from sensors 62a–c and 64 and converts them into positive voltage signals to be read by the microprocessor-based controller 72. An exemplary input waveform is illustrated in FIG. 2. Waveform 100 illustrates a typical AC current measurement that may be taken by one of the sensors 62a–c. Here, the waveform 100 is a nominal 20 Hz signal. Thus, the period for the waveform 100 is nominally 50 ms. The conditioning circuitry 68 is conditioned such that the signal is rectified and converted into a periodic voltage waveform 102 which is scaled between 0 volts and some positive voltage (e.g. 5 volts). Thus, in this example, the input 69 to the controller 72 will be a voltage waveform 102. In an alternate embodiment of this invention, motor 52 may be, for example, a self-starting motor, which may be driven by a chopped waveform 104. Here, the conditioning circuitry 68 will be conditioned to rectify and convert the current measurements into a chopped periodic waveform 106 which is scaled between 0 volts and some positive voltage (e.g. 5 volts).

In addition to the current measurements made by the sensors 62a–c and 64, input 69 provides two digital signals to the controller 72. The digital signals provide information which may be used to detect the zero-crossings or similar period-dependent features of the waveforms 100, as indicated at reference numeral 108. In the illustrated example, the digital signal will be HIGH when the waveform 100 is positive (i.e. the phase is in the first 180° of its cycle) and LOW when the waveform 100 is negative (i.e. the phase is in the second 180° of its cycle). By polling these two signals and comparing their present state against their previous state, a determination can be made as to whether a zero-crossing or similar event has occurred. The zero-crossing provides the controller 72 with information to determine when a new half-period begins in the AC waveforms sampled by sensors 62a–c and 64, as discussed further herein.

Referring again to FIG. 1, based on the sensor output signals received from sensing module 56, controller 72 executes processing and control routines in accordance with a program stored in memory 74 to react to parameters associated with the monitored currents. Such parameters may be related to the relay's reporting functions and fault protection functions and may include, for example, average current, current imbalance, a vector sum of currents, occurrence of a fault condition, and so forth. Controller 72 is further configured to generate an output signal or output data based on the parameters. For example, controller 72 may provide a status signal indicative of the occurrence of a fault condition, a trip signal to interrupt current flow through the power conductors, or a reporting signal representative of such monitored parameters as average current, phase current, current imbalance, ground fault current, and so forth. The output signal or data may be provided to external stand-alone devices (e.g., a contactor 81, HIM 75, system controller 79) and/or to other networked devices.

In the embodiment illustrated, controller 72 is configured to de-energize a relay coil 76 of a sub-miniature relay upon detection of a fault condition associated with the current flow through the power conductors. (e.g., ground fault, phase loss, overcurrent). De-energization of coil 76 opens a relay contact 78, thus providing a trip signal at outputs 80a and 80b to cause interruption of current flow through the power conductors 54a–c. For example, outputs 80a and 80b may be appropriately connected such that relay contact 78 is in series with an external power supply and the energization coil (not shown) of three-phase contactor 81. When relay contact 78 opens in response to indication of a fault condition, the coil of contactor 81 is de-energized and the contactor pairs of the contactor open, interrupting current flow through the power conductors 54a–c.

As mentioned above, overload relay 50 can be configured to exchange data with other networked devices or controllers via terminals 83a–d. Data exchange between relay 50 and other networked devices passes through a communication interface 84 of control module 58. Communication interface 84 formats the data in an appropriate manner for exchange between controller 72 and other networked devices.

In the embodiment illustrated in FIG. 1, relay 50 receives power from an external networked source to provide energy for its electronic devices. The power, which is received via terminals 83, is appropriately conditioned by a DC/DC converter 88. For example, DC/DC converter 88 may convert 24 VDC received from the network to 5 VDC, which is a level that is compatible with the relay's internal electronic components. System controller 79 may provide for overall control of the motor system. Further, the motor 52 may be driven by a variable frequency drive 90. The variable frequency drive 90 may be configured to allow the motor to operate in a frequency range of 20 Hz –250 Hz. The motor speed provided by the drive 90 may be selected and controlled by a motor controller 92. The variable nature of the frequency and the wide frequency range may provide challenges which may be overcome by the present technique, as will be discussed herein.

In an exemplary configuration, controller 72 will process the information received from the conditioning circuitry 68 and 70 to determine whether an over-current condition or other unwanted condition exists and generally monitor operation of the relay 50 and motor 52. To determine whether an over-current condition exists, the controller 72 in the present embodiment will calculate RMS values for the currents provided by the conditioning circuitry 68. Generally, an RMS value is calculated by computing the quotient of the sum of the squared samples divided by the number of samples and finding the square root of the resulting value. That is:

$$X_{rms} = [\text{sum\_of\_the\_squared\_samples/number\_of\_samples}]^{1/2}$$
$$= [(x_1^2 + x_2^2 + \ldots + x_n^2)/N]^{1/2}.$$

In one embodiment of the present invention, x represents current. Thus, RMS currents measured through sensors 62a–c (and 64) are calculated according to the formula above. However, in an alternate embodiment, other RMS values (e.g. power, voltage) may be used. For simplicity, the currents measured through sensors 62a–c and 64 will be referred to as L1, L2, L3 and ground fault, respectively.

Figure 3:
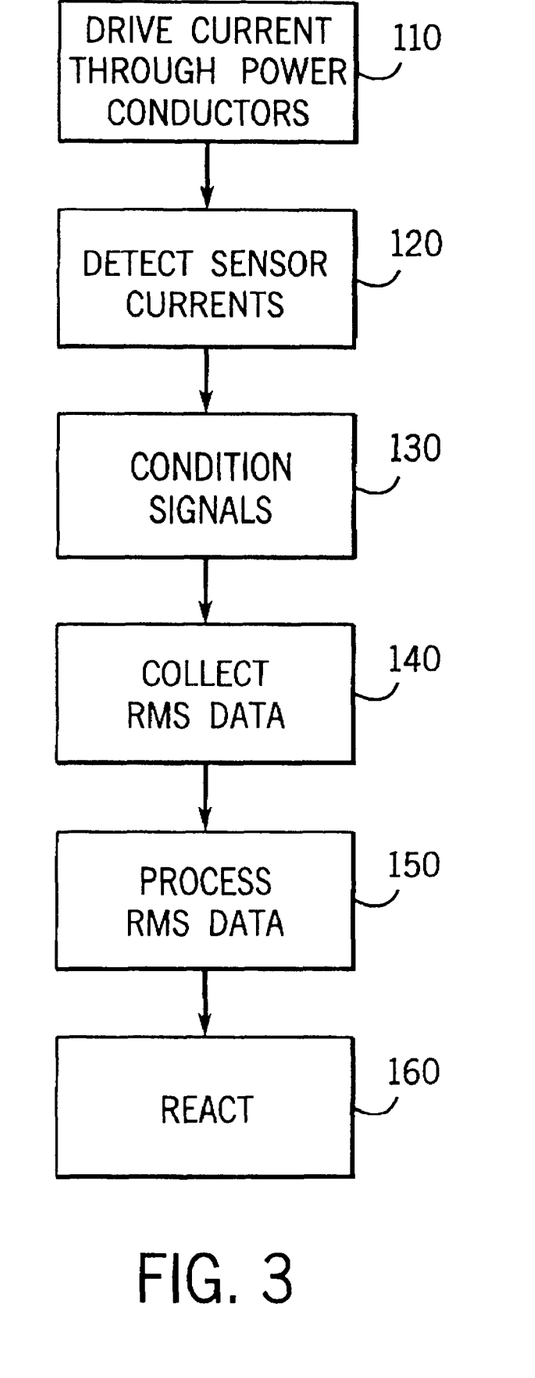
FIG. 3 is a flow chart illustrating a current detection process implementing an RMS calculation.

FIG. 3 illustrates a block diagram of the fault detection process, according to the present technique. In a system, such as a motor system, current is driven through power conductors 54a, 54b and 54c as illustrated by block 110. Next, the current is detected through sensors 62a–c and 64, as illustrated by block 120. Conditioning circuitry 68 and 70 then converts the signals into positive voltage waveforms to be processed by controller 72, as illustrated in block 130. Next, the controller 72 executes algorithms for collecting and processing data from these waveforms, as will be described further below. In particular, as illustrated by block 140, a first algorithm provides for the collection of the waveform data used to compute the RMS data. Next, a second algorithm is implemented as illustrated by block 150. Here the waveform RMS data which has been collected and computed is processed to determine whether a fault condition exists and generally to report current operating states (e.g. the current RMS value). Lastly, the HIM 75, System Controller 79, or contactor 81 may react based on the RMS data, as illustrated by block 160. That is to say that if a fault condition is found, the system may react by illuminating an error indicator, sounding an alarm, interrupting current to this motor, and so forth. As will be understood by those skilled in the art, steps 110, 120, 130, 140 and 150 will be continually repeated as long as the conditions are being monitored in the system.

Figure 4:
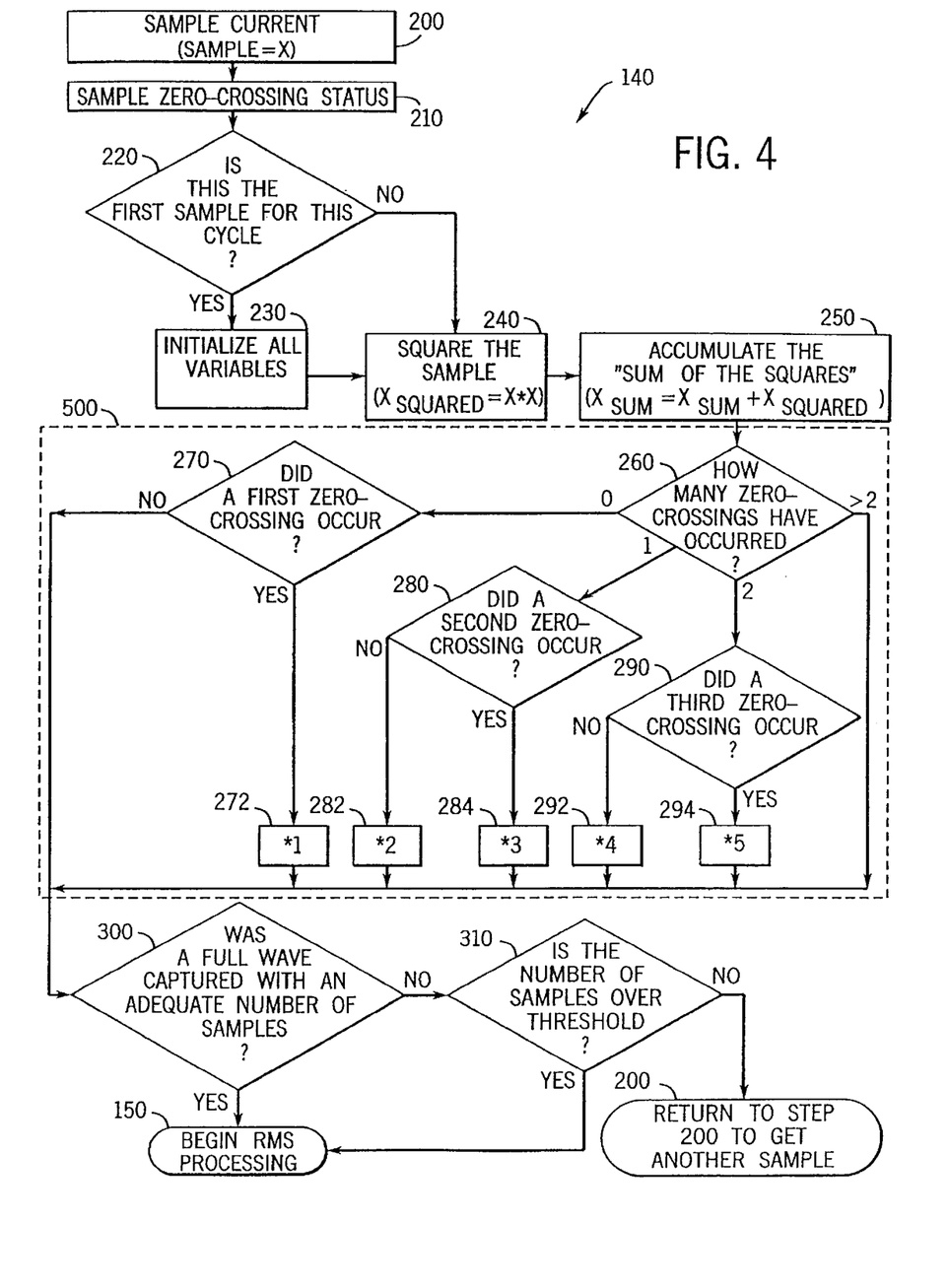
FIG. 4 is a flow chart illustrating a data acquisition mechanism including several data analysis routines for an RMS calculation.

FIG. 4 illustrates an exemplary flow chart of the RMS data collection routine 140 (FIG. 3). This mechanism is responsible for acquiring the raw line data and accumulating the sum of the squared samples and the number of samples for use in the RMS calculation. As noted above, analog information in the form of scaled and filtered full wave rectified AC signals is continuously presented to the controller 72. In the example described above, these signals represent L1 current, L2 current, L3 current and ground fault current. Additionally, two digital signals provide information which is used to detect when a zero-crossing, or similar period-dependent event of one of the current waveforms occurs. By way of example, these digital signals are HIGH for their respective phase when that phase is in the first 180° of its cycle, and LOW during the second 180° of its cycle. By polling these two signals and comparing their present state against their previous state, a determination can be made as to whether a zero-crossing occurred.

Every 100 milliseconds, a data acquisition cycle is triggered by the operating system. This cycle consists of a series of high-priority timer-based interrupts spaced 500 μs apart. On average, it takes approximately 250 μs to execute the code associated with each of these interrupts. This leaves time between the interrupt-based samples for execution of other high priority tasks. The number of these interrupts that occur in a given acquisition cycle depends upon the frequency of the line that is being sampled. The total elapsed time for a complete acquisition cycle can take anywhere from 13 ms to 51 ms, as will be further explained below with reference to FIG. 6.

Referring now to FIG. 4, a flow chart of the RMS data collection algorithm 140 is illustrated. First, samples of all currents (L1, L2, L3, and ground fault) are taken by the microprocessor-based controller 72 as indicated at step 200. Along with these samples from the AC signal, the status of digital signals containing L1 and L2 zero-crossing information are also sampled at step 210. Thus, at this point, the controller 72 has AC and digital signal samples. Next, the algorithm 140 checks to see if this is the first sample for this cycle as summarized at step 220. If it is the first sample for this cycle, all variables, such as sample count and RMS calculation variables are initialized at step 230. After initialization, the "Sum of the Squares" accumulation begins. Thus, referring again to step 220, if the sample taken is anything other than the first sample for this cycle, no initialization process is necessary.

The RMS data collection algorithm begins the RMS determination by accumulating sample data. In the logic summarized in FIG. 4, only mathematical operations which are absolutely necessary to be performed at this point, are performed, and the sample data is combined. To begin this process, the current sample X, is squared at step 240. As previously discussed, to minimize memory use and interrupt time, a simple running total of the sum of the squared sample values is kept, as summarized in step 250. Here, the accumulated sum of the square total is represented by $X_{sum}$. Sum of the squared samples $X_{sum}$ and number of samples N, values are accumulated during the data collection cycle. Because the data collection algorithm 140 accumulates a running total of the sum of the squared samples, rather than storing each sample in memory for later calculations, less memory is used. Further, once the RMS data collection algorithm has finished executing, the only calculations that remain to be performed are the division by the number of samples and the square root. To enhance computation efficiency, the square root function, which is relatively time-consuming, is delayed and only a running total of the sum of the squares in kept during data collection. The square-root function is only performed when the zero-crossing and number of samples status indicates this operation is in order. Activities that do not need to be performed in the time critical data collection cycle are diverted to the non-time critical background, thereby making this solution achievable on a time constrained processor.

Because of the variable frequency nature of the signals being sampled, the optimal method for performing the RMS calculations will not be known until the data collection algorithm reaches a certain point. Therefore, data is gathered in such a way throughout the entire cycle so that the final RMS calculations can be made one of three ways depending upon the zero-crossing and number of samples gathered during the collection cycle.

In the illustrated embodiment, the zero-crossing status is determined by polling, rather than by having a zero-crossing circuit interrupt the controller 72, as is common in traditional methods of determining zero-crossing. Polling offers the processor 72 complete control as to how and when it determines the existence of a zero-crossing condition. The traditional interrupt-based approach can flood the processor with unwanted activity at higher frequencies. Therefore systems which use typical interrupt-based techniques are commonly restricted to lower frequency ranges, such as 50 Hz–60 Hz, or they use higher power dedicated processors. Disadvantageously, higher power processors may increase component count and size, as well as overall system cost.

Preferably, RMS calculations are made based on samples from a full waveform. If there is insufficient data to make RMS calculations based upon the full waveform, a half waveform sample set may be used. Alternately, a fixed duration set of sample data may be used to make the RMS calculations. To determine which calculations will be made, the present technique allows for determination of the quality and quantity of waveform data that has been accumulated. By counting the number of zero-crossings in a cycle and the number of samples taken, the controller 72 can determine whether a full waveform, half waveform, incomplete waveform, or multiple waveforms( high-frequency) has been sampled.

Referring again to FIG. 4, the next step in the algorithm 140 is to determine how many zero-crossings have occurred, as summarized at step 260. When the algorithm is initialized, the number of zero-crossings is zero. Thus, initially the check for number of zero-crossings will advance down the zero leg of the zero-cross state machine 500. The system will then check to see if the sample that was obtained occurred just after a first zero-crossing as indicated at step 270.

At this point, the RMS data sampling algorithm may be best explained through the use of an iterative example. Continuing from the flow above, assume the first sample of the cycle. The algorithm will check to determine whether this sample occurred just after a first zero-crossing at step 270, as indicated above. If it did not, the algorithm will check to determine whether a full waveform was captured with an adequate number of samples at step 300. The algorithm determines that a full waveform is captured when three zero-crossings are detected. In this example, it is clear that this criterion has not been met initially. Thus, the algorithm 140 will check to determine whether the number of samples acquired exceeded a maximum threshold as shown at step 310. This threshold value represents some maximum number of samples that the algorithm will allow without having captured a full waveform, before it will process the RMS values. In other words, if a full waveform with an adequate number of samples has not been captured before the threshold number of samples have been taken, RMS values will be calculated based upon the threshold number of samples.

In one embodiment of this algorithm, the processing will occur every 100 ms. Based upon other timing requirements as will be discussed with reference to FIG. 6, the threshold is set so that the RMS sample cycle takes no more than fifty-one percent of the 100 ms cycle. Thus, if a full waveform with an adequate number of samples is not captured within 51-ms, the RMS processing will be done using the threshold number of samples. Because the sampling routine is an interrupt which executes every 500 μs (0.5 ms), two samples can be taken every millisecond. Thus, the inquiry of step 310 will force processing to occur if 102 samples have been obtained, regardless of whether a full waveform has been captured. Following the iterative example above, only one sample has been taken, thus the response at step 310 will be negative. Thus, another sample will be taken 500 μs from the time that the present sample interrupt first occurred. That is to say that the algorithm 140 will return to step 200.

It should be clear that this same flow will occur until a zero-crossing is detected or 102 samples are gathered. In the latter case, the answer to whether the threshold response has reached 102 at step 310 will become affirmative. In this case, the program will proceed to the processing algorithm 150. The more likely scenario is that a zero-crossing will be detected at some point. Returning to step 270 once such a zero-crossing is detected, the zero-crossing count will be incremented to one, and another sum of RMS squared data begins to be accumulated for the first half waveform for possible use in the event that calculations are made in the processing algorithm based on a half or full waveform acquisition as indicated at 272. From here, the algorithm will again determine whether a full waveform has been captured with an adequate number of samples at step 300. The logical flow then continues as discussed above.

Continuing with the example, when one zero-crossing has been detected, and assuming further that 102 samples have not been obtained, the algorithm will execute another sampling routine at step 200. This time, when the zero-cross state machine 500 is reached, the zero-crossing count is one. The algorithm will now determine whether a second zero-crossing has been detected for the same waveform at step 280. In other words, if a zero-crossing was first detected on the L1 current waveform, the controller 72 will search for the next zero-crossing for the L1 current. If a second zero-crossing is not detected, a sum of the squares for the first half waveform continue to be accumulated, as indicated at step 282. Additionally, the number of samples is incremented, this number later being used in the RMS calculations if only a half or full waveform is sampled. Alternately, if a second zero-crossing is detected, the zero-crossing count is incremented to two, and the algorithm begins storing a new accumulated sum of the RMS square data for a second half waveform, as indicated at step 284. The sum of the RMS squared data for the first half of the waveform is stored for possible use in the RMS calculation based on a half or full waveform. For this reason, at step 284 the controller begins accumulating sum of the squared data for the second half of the waveform independently. If a third zero-crossing is not sampled, the accumulated data from the first half waveform may be used for half waveform-based calculations.

Following steps 282 or 284, the algorithm 140 will continue to step 300. Here again, if a full waveform has not been captured and less than 102 samples have been taken, the logic will return again to step 200 to acquire another sample. At this point, two zero-crossings have been detected. Once the zero cross-state machine 500 is executed, the algorithm 140 will determine whether a third zero-crossing has been detected at step 290. If a third zero-crossing is not detected, the algorithm 140 will continue to store the accumulated sum of the RMS squared data for the second half waveform at step 292. The number of samples will also be incremented for possible use in future calculations. Here again, the algorithm 140 will check to determine whether a full waveform has been captured at step 300. Because only two zero-crossings have been detected, and assuming less than 102 samples have been taken, the algorithm will again return to step 200 to acquire another sample. If, on the other hand a third zero-crossing is detected, the number of zero-crossings is incremented to three at step 294. Continuing again to step 300, the algorithm 140 will now detect that a full waveform has been captured. At this point, the controller 72 will also check to determine whether an adequate number of samples have been taken to accurately calculate RMS values based on the full waveform. In one embodiment of the present invention, at least 25 samples are necessary to make an accurate RMS calculation based on a full waveform. Thus, if 25 samples have been taken by the time the third zero-crossing is detected, the data collection algorithm 140 will direct controller 72 to execute the processing algorithm 150. The processing algorithm 150 will be further discussed with reference to FIG. 5.

In the event that three zero-crossings are detected, indicating a full waveform has been sampled, but less than 25 samples have been taken, the algorithm will again return to step 200 to obtain another sample. This time, when the algorithm 140 reaches state machine 500, the zero count is three. Therefore, the algorithm 140 will continue directly to step 300. Samples will be continually taken by repeating the above flow until 102 samples have been taken and step 300 directs the controller 72 to begin the RMS processing algorithm 150. This scenario may occur at very high frequencies where the waveforms are narrow.

Generally, the state machine 500 tracks the number of zero-crossings and accumulates data based on the number of zero-crossings. After each cycle through state machine 500, checks are made to determine whether adequate data has been gathered to allow the acquisition cycle to be terminated. The cycle will be terminated if one of two conditions exists. First, if a full waveform has been captured with an adequate number of samples (i.e. three zero-crossings have been detected and the number of samples acquired for the first and second half waveforms is greater than or equal to 25), then the acquisition cycle will be terminated and the processing cycle will begin. Alternately, if 51 ms have passed (i.e. 102 samples have been taken), the acquisition cycle will be terminated and the processing cycle will begin based upon the collected samples (i.e. half waveform or less or multiple waveforms( high-frequency)). If neither of these conditions exist, another sample interrupt will be scheduled to occur 500 μs from the time of the last interrupt.

Figure 5:
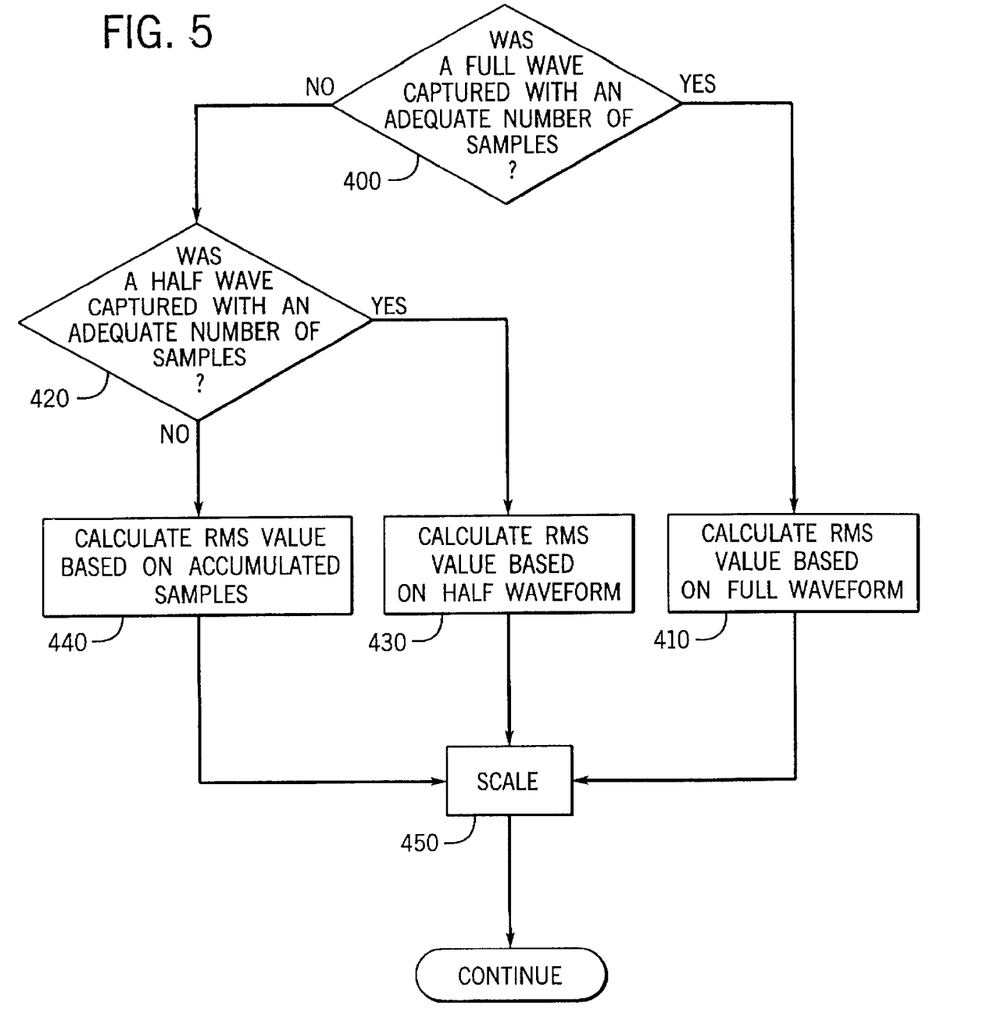
FIG. 5 is a flow chart illustrating the data processing mechanism used in the RMS calculation.

FIG. 5 illustrates a flow chart of the RMS processing algorithm 150. The processing algorithm 150 executes every 100 ms. This mechanism is responsible for converting the sum of the squared samples and number of samples values acquired during the collection algorithm 140 into meaningful current values. The calculations required to complete this process may use a relatively significant amount of time and are executed four times, once for each current value. Because the execution of these calculations is not "real-time" critical however, they are performed during the processor's background cycle.

The processing algorithm 150 offers three alternate means of calculating RMS values based on the output of the collection algorithm 140. The first step 400 in the processing algorithm 150 is to determine whether a full waveform was captured (i.e. three zero-crossings) with an adequate number of samples to make an accurate RMS calculation (i.e. 25 samples). If a full waveform was captured with an adequate number of samples, the RMS calculation is made by adding the accumulated sum of the squared samples for the first half waveform to the sum of the squared samples for the second half waveform, and dividing by the sum by the total samples taken in the first half waveform and the total samples taken in the second waveform and then taking the square root as indicated at step 410 and summarized:

$$X_{rms}=[(x_1^2+x_2^2+\ldots+x_n^2)_{first\_half\_waveform}+$$
$$(x_1^2+x_2^2+\ldots+x_n^2)_{second\_half\_waveform}/^N{first\_half\_waveform\_samples}+^N{second\_half\_waveform\_samples}]^{1/2}$$

This will produce an RMS value based on a full waveform.

Alternately, if either a full waveform was not captured or there are not 25 samples, at step 420, the algorithm 150 will determine whether a half waveform was captured (i.e. two zero-crossing) with an adequate number of samples to make accurate RMS calculations (i.e. 17 samples). As with 25 samples for the full waveform, emperical data has demonstrated that 17 samples may be necessary to maximize the accuracy of a half waveform calculation. If the zero-crossing count equals two, indicating that a half waveform has been captured and there are at least 17 samples, an RMS calculation can be made based on the half waveform data as indicated at step 430. Here, the RMS value will equal the square root of the accumulated sum total of the first half waveform divided by the number of samples:

$$X_{rms}=[(x_1^2+x_2^2+\ldots+x_n^2)_{first\_half\_waveform}/^N{first\_half\_waveform\_samples}]^{1/2}$$

Alternately, if neither of the conditions in step 400 or step 420 are met, an RMS calculation can be made based on the samples that were taken as indicated at step 440. Here, the RMS value equals the square root of the sum of the squared samples over the number of samples, or:

$$X_{rms}=[sum_{13}of_{13}the_{13}squared_{13}samples/number_{13}of_{13}samples]^{1/2}$$

Once the RMS calculation is made, the value is scaled and converted to be used in determining whether a current fault has been reached, or for reporting, as indicated at step step 450.

Figure 6:
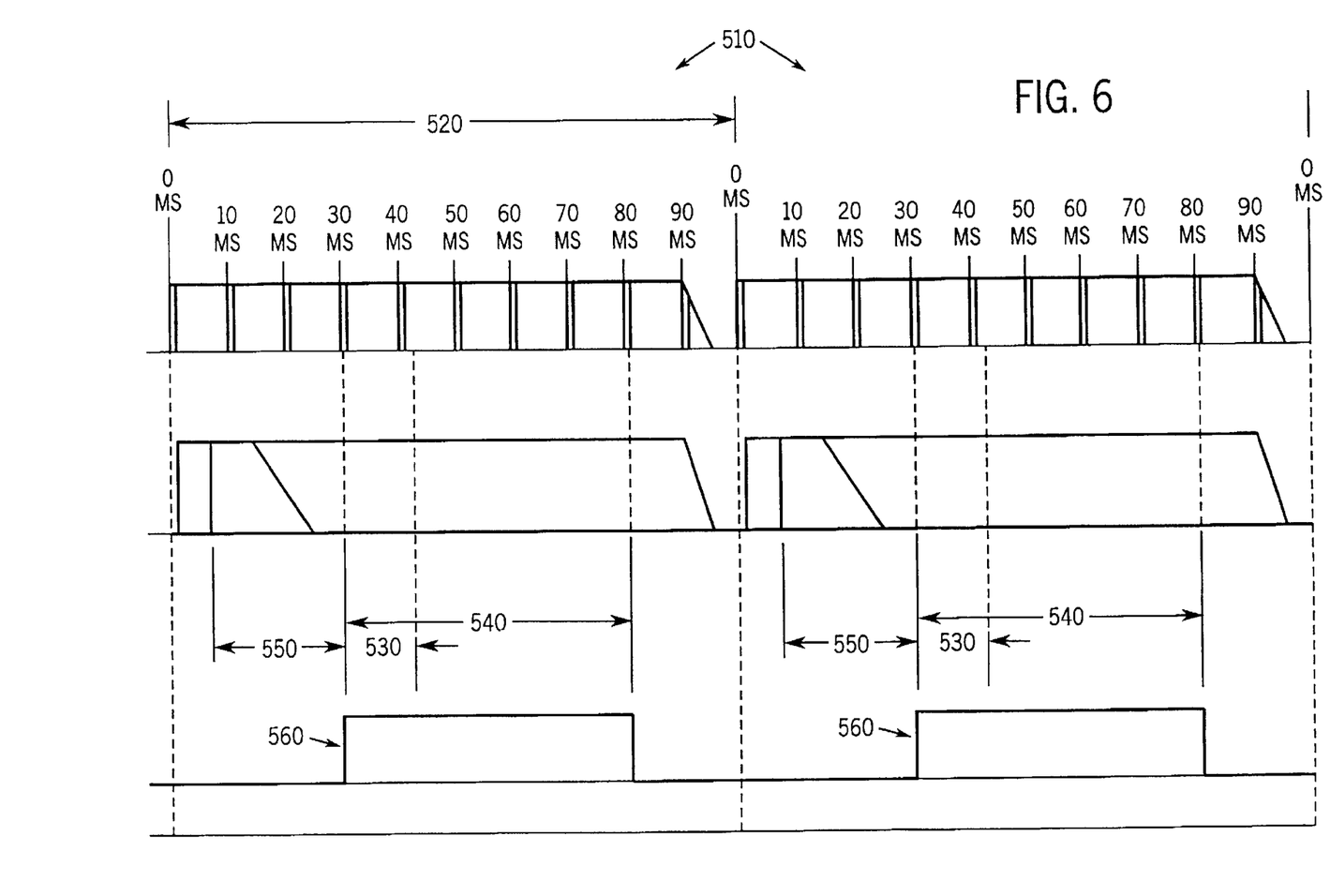
FIG. 6 illustrates an exemplary timing diagram of the RMS calculation algorithm executed along with other functions by a signal processing circuit.

FIG. 6 illustrates an exemplary timing diagram associated with the RMS processing algorithm 150. Two processing cycles 510 are illustrated. As previously discussed in the present example, the RMS processing algorithm 150 is implemented every 100 ms. Thus, a complete RMS processing cycle 520 will occur within each 100 ms period. The data collection algorithm 140 continues sampling every 500 μs (2 samples per millisecond) until sufficient samples are acquired. The RMS data collection cycle may take anywhere from 13 ms to 51 ms, as indicated by the cycle time designators 530 and 540, respectively, based on the frequency of the input signal and the number of zero-crossings obtained. The RMS processing calculations performed by the processing algorithm 150 will be initiated at the beginning of a cycle. Next, there is some length of time associated with application protection, as indicated at 550. As indicated on the timing diagram, the data collection will occur starting around 30 ms into the 100 ms background sweep. The RMS sampling cycle will take anywhere from 13 ms to 51 ms to complete. Here, a full 51 ms cycle is shown, as indicated by RMS sample data 560.

It should further be understood that the specific embodiments shown and described herein are by way of example only, and the invention may be susceptible to various modifications and alternative forms. Accordingly, the invention is not intended to be, and should not be construed as, limited to the particular forms disclosed. Rather, the invention is to cover all modifications, equivalents, and alternatives falling within the spirit and scope of the invention as defined by the following appended claims.

What is claimed is:

1. A method of calculating root-mean-square values comprising the acts of:
    (a) sampling a periodic waveform in a fixed or variable frequency signal;
    (b) providing the sampling information to a processor;
    (c) accumulating a sum total for the samples taken during an acquisition cycle;
    (d) tracking the number of samples taken during an acquisition cycle;
    (e) tracking the number of zero-crossings during an acquisition cycle; and
    (f) choosing a particular calculation algorithm based on the number of samples and number of zero-crossings taken during an acquisition cycle.

2. The method, as set forth in claim 1, wherein act (a) comprises the act of sampling a waveform provided by a sensing circuit which measures the current flow through a power conductor.

3. The method, as set forth in claim 2, wherein act (a) further comprises the act of sampling an alternating current waveform.

4. The method, as set forth in claim 1, wherein act (b) comprises the act of providing analog signals and digital signals to the processor.

5. The method, as set forth in claim 1, wherein act (b) further comprises the act of providing an alternating voltage waveform to the processor which is representative of the current being applied to the load.

6. The method, as set forth in claim 1, wherein act (b) further comprises the act of providing an alternating voltage waveform to the processor.

7. The method, as set forth in claim 4, wherein act (c) comprises the act of squaring each data sample and adding it to the previous sample.

8. The method, as set forth in claim 1, wherein act (d) comprises the act of incrementing a sample counter each time a new sample is taken during a particular acquisition cycle.

9. The method, as set forth in claim 4, wherein act (e) comprises the act of incrementing a zero-crossing counter based on transitions between digital signals taken during a particular acquisition cycle.

10. The method, as set forth in claim 1, wherein act (f) further comprises the act of calculating the root-mean-square-value using a full waveform algorithm if at least three zero-crossings have been detected and a minimum number of samples have been taken during a particular acquisition cycle.

11. The method, as set forth in claim 1, wherein act (f) further comprises the act of calculating the root-mean-square-value using a half waveform algorithm if two zero-crossings have been detected and a minimum number of samples have been taken during a particular acquisition cycle.

12. The method, as set forth in claim 1, wherein act (f) further comprises the act of calculating the root-mean-square-value using a default algorithm if less than two zero-crossings have been detected.

13. The method, as set forth in claim 1, wherein act (f) further comprises the act of calculating the root-mean-square-value using a default algorithm if a minimum number of samples have not been taken between two or three zero crossings.

14. A system for computing root-mean-square values for a waveform, comprising:

a sensor; and a control circuit electrically coupled to the sensor and configured to take sample data from the sensor, accumulate sum totals of the data, monitor the number of samples and the number of zero-crossings for a particular acquisition cycle, choose a processing algorithm based on the number of samples and number of zero-crossings for a particular acquisition cycle and calculate the root-mean-square value for a particular acquisition cycle.

15. The system, as set forth in claim 14, wherein the sensor is configured to monitor current flow through a power conductor and provide a sensor output indication representative of the current flow.

16. The system, as set forth in claim 15 wherein the current flow is controlled by a variable frequency drive.

17. The system, as set forth in claim 16, further comprising a motor coupled to the variable frequency drive.

18. The system, as set forth in claim 14, wherein the control circuit produces an output signal which may be used to interrupt the current flow through the power conductor when a fault condition is detected.

19. The system, as set forth in claim 18, wherein the fault condition is one of a ground fault condition, a phase loss condition, and an overcurrent condition.

20. A circuit for computing the root-mean-square value of a waveform, the circuit configured to take sample data, accumulate sum totals of the data, monitor the number of samples and the number of zero-crossings for a particular acquisition cycle, choose a processing algorithm based on the number of samples and number of zero-crossings for a particular acquisition cycle and calculate the root-mean-square value for a particular acquisition cycle.

21. A circuit, as set forth in claim 20, wherein the waveform is representative of alternating current flow.

22. A circuit, as set forth in claim 20, wherein the alternating current flow is controlled by a variable frequency drive.

* * * * *